United States Patent [19]
DiMartini et al.

[11] 4,039,322
[45] Aug. 2, 1977

[54] METHOD FOR THE CONCENTRATION OF ALKALINE BISMUTHIDE IN A MATERIAL ALSO CONTAINING MOLTEN LEAD

[75] Inventors: Carl Richard DiMartini, Piscataway; William Lafayette Scott, Lebanon, both of N.J.

[73] Assignee: Asarco Incorporated, New York, N.Y.

[21] Appl. No.: 673,179

[22] Filed: Apr. 2, 1976

[51] Int. Cl.² .............................................. C22B 7/00
[52] U.S. Cl. .......................................... 75/63; 75/70; 75/78; 266/208
[58] Field of Search .................. 75/63, 77, 78, 70, 79; 266/208, 227

[56] References Cited

U.S. PATENT DOCUMENTS

| 1,553,540 | 4/1932 | Betterton | 75/78 |
| 1,853,538 | 4/1932 | Betterton | 75/78 |
| 1,853,539 | 4/1932 | Betterton | 75/78 |
| 2,109,144 | 2/1938 | Betterton et al. | 75/78 |
| 2,133,327 | 10/1938 | Jollivet et al. | 75/78 |
| 2,204,651 | 6/1940 | Betterton et al. | 75/78 |
| 2,213,197 | 9/1940 | Betterton et al. | 75/78 |
| 3,420,658 | 1/1969 | Reding et al. | 266/227 |
| 3,516,478 | 6/1970 | Dunn et al. | 266/227 |
| 3,661,373 | 5/1972 | Cheltson et al. | 266/208 |

Primary Examiner—L. Dewayne Rutledge
Assistant Examiner—Michael L. Lewis
Attorney, Agent, or Firm—R. J. Drew; E. J. Schaffer

[57] ABSTRACT

Alkaline bismuthide is concentrated in a debismuthizing dross comprising the alkaline bismuthide and molten lead by a method involving charging the dross onto a heat-resistant screen or sieve of suitable mechanical strength. The screen has openings of such size as to enable the formation and retention thereon of a molten lead-pervious residue cake comprising particles of the alkaline bismuthide, for example of crystals of calcium magnesium bismuthide (Ca Mg$_2$Bi$_2$). The dross is subjected on the screen to the influence of a partial vacuum drawn from the opposite side of the screen from the dross, and the molten lead is sucked or pulled through pore channels of the porous residue cake of the alkaline bismuthide particles which is formed on the screen, and without any significant physical compression of the cake with attendant blockage of the pores of the cake, and then through the screen openings under the influence of the partial vacuum.

17 Claims, 5 Drawing Figures

METHOD FOR THE CONCENTRATION OF ALKALINE BISMUTHIDE IN A MATERIAL ALSO CONTAINING MOLTEN LEAD

BACKGROUND OF THE INVENTION

1. Statement of the Invention

This invention relates to the concentration of alkaline bismuthide in a material comprising alkaline bismuthide and lead, and more particularly to a new and improved method for the concentration of alkaline bismuthide in a dross comprising alkaline bismuthide and lead.

2. Description of the Prior Art

It is known in the prior art to remove bismuth from lead by treating the molten bath of bismuth-containing lead with appropriate alkaline earth or alkali metal as debismuthizing reagent. The bismuth forms an alkaline bismuthide with the debismuthizing reagent and the alkaline bismuthide forms a dross on the molten bath surface, the dross being referred to in the art as alkaline bismuthide dross or as "debismuthizing" dross. The dross contains an appreciable amount of lead in addition to the alkaline bismuthide. Calcium and magnesium are presently utilized as debismuthizing reagents for removing the bismuth from the lead. Sodium and potassium have also been utilized heretofor as the debismuthizing reagent. The dross is then separated from the lead, for instance by skimming.

In the recovery of the bismuth from the debismuthizing dross, it is important that the alkaline bismuthide be concentrated in the dross in preparation for further refining to obtain pure bismuth. In this regard, it would be highly desirable to at least double the bismuth content of the debismuthizing dross in preparation for further refining. For example, if the debismuthizing dross contained 6% of bismuth as alkaline bismuthide, it is highly desirable to concentrate the bismuthide in the dross so as to increase the bismuth content to 12% or higher.

Heretofor the bismuthide has been concentrated in the debismuthizing dross by either mechanically pressing the dross, or by liquating the dross under a flux. In the pressing of the debismuthizing dross, the dross was pressed to expel molten lead from the bismuthide particles by steel plates by means of hydraulic pressure applied to the plates. Some molten lead is expelled but the pores of the alkaline bismuthide solid mass or cake are soon blocked due to significant physical compression of the bismuthide cake by reason of the mechanical pressing. Consequently, additional lead can not be pressed out of the cake to any considerable extent, and the cake retains considerable molten lead occluded within the bismuthide cake, with molten lead surrounding partially or completely bismuthide particles in the interior of the cake. Further, the interior of the compressed cake is substantially impermeable or non-pervious to air due to the mechanical pressing, and it is necessary that alkaline bismuthide cake be air permeable or pervious for a subsequent bismuth recovery operation involving heating of the alkaline bismuthide cake in air, to ignite and burn autogenously the cake to liberate elemental bismuth from the alkaline bismuthide. In the liquating method, the debismuthizing dross is liquated under a flux, usually a chloride flux. Liquating the dross under a flux is costly for the reasons considerable bismuth is diverted back to the lead and the chloride flux is expensive. Further, liquating under a flux presents a problem of disposal of slag produced, for the reason a salt slag is produced that is usually difficult to dispose of. Moreover, the liquation of the dross under a flux is a high temperature operation, involving temperatures of about 700° C.

OBJECTS OF THE INVENTION

One object of this invention is to provide a new and improved method for enriching a debismuthizing dross in bismuth which is non-polluting to the atmosphere.

Another object of this invention is to provide a new and improved method for enriching a debismuthizing dross to a desired or required concentration in bismuth in preparation for further refining of the dross to obtain pure or substantially pure bismuth.

A further object is to provide a method for enriching a debismuthizing dross in bismuth which results in a materially higher content of bismuth in the dross than is attained by the prior enrichment methods.

An additional object is to provide a method for concentrating alkaline bismuthide in a debismuthizing dross resulting in an air-pervious or air-permeable bismuthide-enriched cake, which is eminently adapted for treatment in a Bi recovery process involving the heating ignition and combustion autogenously of the bismuthide-enriched cake in air to liberate elemental bismuth.

Another object is to provide a method for concentrating alkaline bismuthide in a debismuthizing dross which provides predicatable and consistent results in enriching such dross in the bismuthide.

Another object is to provide a method for concentrating alkaline bismuthide in a debismuthizing dross which avoids diverting significant quantities of bismuth or bismuthide back to lead.

A further object is to provide a method for concentrating alkaline bismuthide in a debismuthizing dross which avoids the difficult problem of disposal of a salt slag.

Additional objects and advantages will be apparent as the invention is hereinafter described in more detail.

SUMMARY OF THE INVENTION

The method of the present invention for the concentration of alkaline bismuthide comprises supplying the material comprising the solid alkaline bismuthide particles and molten lead, for example a debismuthizing dross comprising alkaline bismuthide solid particles and molten lead, onto a heat-resistant screen or sieve of substantial mechanical strength. The screen has openings of such size as to enable the formation and retention thereon of a pervious residue cake comprising particles of the alkaline bismuthide. The material is subjected on the screen to the influence of a partial vacuum provided from the opposite side of the screen from the material, and the molten lead is drawn or sucked through pore channels of the porous residue cake comprising the alkaline bismuthide which is formed on the screen and through the screen openings under the influence of the partial vacuum without any significant physical compression of the residue cake, thereby substantially eliminating or minimizing blockage of the pore channels in the porous residue cake due to collapse and constriction of the pore channel walls. The resulting air-pervious residue cake, which is of relatively high alkaline bismuthide content as compared to that of the debismuthizing dross, is then separated from the screen or sieve.

The blockage of the pore channels in the residue cake of alkaline bismuthide solid particles due to collapse and constriction of the pore channels, which occurred in the prior art mechanical pressing of the debismuthizing dross to expel the molten lead and which is obviated or eliminated by the present invention, is undesirable and disadvantageous due to resulting in a considerable quantity of molten lead being occluded or entrapped within the alkaline bismuthide residue case. The occluded lead encapsulates the bismuthide particles, renders the bismuthide residue cake impervious or non-permeable to air, and prevents the satisfactory recovery of elemental bismuth from the residue cake be a recovery process involving the heating ignition of the residue cake and the combustion of the residue cake autogenously in air, and usually in atmospheric air. The bismuth-recovery process involves heating such air-permeable or pervious residue cake in the presence of a free oxygen-containing gas, such as air, to the ignition temperature of such cake, which is ordinarily about 850° F.–900° F., followed by burning such residue cake autogenously to oxidize the alkali and a portion of the lead to the substantial exclusion of the bismuth, to form a particulate residue comprising elemental bismuth, elemental lead, lead oxide and alkali oxide.

In a specific embodiment, a closed or sealed or substantially closed or sealed chamber is provided on that side of the screen from which the partial vacuum is drawn on the material comprising the alkaline bismuthide and molten lead. The material comprising the alkaline bismuthide and molten lead forms one enclosure barrier or wall of the closed or sealed chamber.

It is critical in the present invention that a partial vacuum equivalent to at least 15 inches Hg be drawn on the alkaline bismuthide-containing molten lead on the residue cake. The reason for this is that at a partial vacuum much less than 15 inches Hg, the molten lead is not drawn or filtered through the pervious residue cake at a significant, feasible rate. We found there was no criticality in the upper limit of partial vacuum that we drew on the alkaline bismuthide-containing molten lead on the filter, and the molten lead can be drawn through the pervious residue cake at the highest partial vacuum that we could attain, which was about 28 inches Hg.

The material comprising the alkaline bismuthide particles and molten lead, such as the debismuthizing dross, is ordinarily at a temperature in the range of about 700° F. to about 1000° F. during the concentrating method of this invention.

The residue cake is formed or built up on the filter screen or sieve to a thickness sufficient to retain on or in the cake the solid particles of alkaline bismuthide, such particles being small particles of size of typically a few microns. The thickness of the residue cake can vary considerably so long as its thickness is sufficient to retain the solid alkaline bismuthide particles on the cake. For example, a residue cake of about 4 inch thickness on the filter screen separated out the particles of bismuth combined with calcium and magnesium from the molten lead in about 10 minutes with 4000 lbs. of molten debismuthizing dross fed to the screen; whereas an about 8 inch thick cake separated out the particles of bismuth combined with calcium and magnesium in about 60 minutes with 200 lbs. of molten debismuthizing dross fed to the screen. The residue cake of sufficient thickness to separate the alkaline bismuthide solid particles from the molten lead by retention of such bismuthide solid particles on or in the cake, is formed on the screen or sieve by supplying the material comprising the alkaline bismuthide and molten lead, e.g. debismuthizing dross, onto the screen, and maintaining or holding such material on the screen under atmospheric pressure and without subjecting this material to the partial vacuum for a brief period, typically in the range of about 1 - 2 minutes, and sufficient to form a seal on the screen, by forming a cake or residue cake of sufficient thickness on the screen to form the seal. By "seal" as used herein is meant a closure formed on the screen or sieve by the cake or layer of the material comprising the alkaline bismuthide and molten lead, e.g. the debismuthizing dross, which is formed on the screen or sieve. Consequently when this "seal" cake or layer of such material is subjected to the action of a partial vacuum drawn on such material on the screen, the molten lead is drawn through pore channels of the cake or layer and through the screen or sieve openings.

Any suitable screen or sieve is utilizable in the method of this invention. We have attained excellent results in the method by employing a so-called de-watering screen constructed of parallel, narrowly spaced-apart rods of triangular shape in cross-section and having spacings or openings between the rods of about 0.005 inch in width. Such de-watering screen, although not having cross rods or woof rods or wires, is nevertheless included herein in the terms "screen" and "sieve". The de-watering screen is obtainable from Clawson and Associates, 6596 Highway No. 100, Nashville, Tenn. Any other suitable screen or sieve is utilizable in the method of this invention. The screen or sieve will usually have screen or sieve openings of size in the range of about 0.001 inch to about 0.01 inch. The screen or sieve utilized in this invention should, however, be a screen or sieve of substantial mechanical strength sufficient to enable the building and retention or maintenance thereon of the air-pervious residue cake of this invention while permitting a significant and acceptable flow rate of the molten lead filtrate through the screen openings (after passage of the molten lead through the pore channels of the porous residue cake). The screen or sieve should also be of substantial mechanical strength and of sufficient strength to support the molten lead and alkaline bismuthide charged to the upper surface of the screen. The screen or sieve can be fabricated of any material incapable of alloying with the lead and alkaline bismuthide and of the substantial mechanical strength mentioned immediately above. Exemplary of the materials of fabrication of the screen is steel, ceramic-coated metal, e.g. ceramic-coated steel, mineral wool, e.g. glass wool and rock wool, and ceramics such as, for example, porcelain.

The primary function of the screen herein is to build and maintain the pervious residue cake, and the screen is not the main or primary filtering medium although the screen may filter larger size alkaline bismuthide particles from the molten lead when present therein. The filtering medium in this invention, at least for most of the alkaline bismuthide particles, is the porous or pervious residue cake, inasmuch as only the pervious residue cake has sufficiently small openings or pore channels to filter out the minute or extremely small alkaline bismuthide solid particles, typically of size of about $1\mu$ - $200\mu$, from the molten lead.

The following examples further illustrate the invention:

EXAMPLE I

Two-hundred and seventy lbs. of debismuthizing dross containing alkaline earth bismuthide and lead was melted in a kettle as 825° F. The dross had the following analysis:

|  | By Weight |
|---|---|
| Bi | 8.5 % |
| Ca | 0.85 % |
| Mg | 1.33 % |
| Pb | Substantially the balance |

The dross had the consistency of a wet mud at this temperature of 825° F., and was composed of small crystals of alkaline earth bismuthide (Ca Mg$_2$Bi$_2$) dispersed in the molten lead which also contained a small amount of Sb and Zn. Such molten dross was ladled onto the 100 mesh stainless steel screen of a pre-heated filtration unit without any vacuum being drawn on the molten dross. The filtration unit consisted of a pipe 14 inches in diameter and 30 inches in length welded to a funnel-shaped top. The funnel-shaped top was 14 inches in length, had a diameter of 14 inches at the place of welding to the pipe and a diameter of 20 inches at its top portion, and had two lifting lugs at opposite sides of its top edge. A flange was inserted between the pipe and the funnel-shaped top upon which the 100 mesh stainless steel screen was placed. The lower portion of the pipe was inserted into a pool of 300 lbs. of molten lead in the bottom of a 500 lb. lead kettle, and the lead pool then permitted to solidify thereby providing a seal for the filtration unit during evacuation. The upper portion of the pipe was connected to a vacuum pump by a rubber hose. The funnel-shaped top was pre-heated to a temperature of 825° F. by two semi-circular gas-air burners inserted about the intermediate portion thereof from opposite sides of this funnel-shaped top. The molten dross was held on the stainless steel screen for a period of about 1 minute without any partial vacuum being drawn on the dross from below the screen, for the purpose of forming a seal by means of forming a suitable cake comprising crystals of the alkaline bismuthide on the screen. A partial vacuum of 28 inches Hg was then drawn on the cake from beneath the screen by means of the vacuum pump, whereby the molten lead on and in the cake was drawn through the pore channels of the residue cake without any major compression of the residue cake and without any significant blockage of flow by constriction or collapse of the walls forming the pore channels of the residue cake, under the influence of the partial vacuum, and the alkaline bismuthide crystals dispersed in the molten lead were separated from the molten lead and retained by the cake.

After 1 hour, the partial vacuum was released, the heat at the funnel-shaped top of the unit was turned off, the lead seal in the kettle melted, and the filter unit was lifted from the molten lead in the kettle with the aid of a hoist and the lifting lugs. The residue cake was then removed from the screen simply by turning the filter unit upside down. The residue cake and the filtrate were separately carefully weighed, and samples obtained for analysis. The residue cake was analyzed by cutting it into quarter sections, and then drilling samples from locations on each quarter section. The residue cake, which had a total weight of 125 lbs., had the following analysis (percentages being by weight):

| Bi | 17.9 % |
|---|---|
| Ca | 1.8 % |
| Mg | 2.8 % |
| Pb | Substantially the balance |

The filtrate analyzed as follows (percentages being by weight):

| Bi | 0.55 % |
|---|---|
| Ca | 0.06 % |
| Mg | 0.05 % |
| Pb | Substantially the balance |

EXAMPLE II

Two-hundred and three lbs. of debismuthizing dross containing alkaline earth bismuthide and lead was melted in a kettle at 825° C. The dross was a higher grade dross, i.e. had a higher bismuth content, than the debismuthizing dross of Example I, and had the following analysis:

|  | By Weight |
|---|---|
| Bi | 15.0 % |
| Ca | 1.5 % |
| Mg | 1.9 % |
| Pb | Substantially the balance |

The dross had the consistency of a wet mud at this temperature of 825° C., and was composed of small crystals of alkaline earth bismuthide (Ca Mg$_2$Bi$_2$) dispersed in the molten lead which also contained the small amounts of Sb and Zn. Such molten dross was ladled onto the 100 mesh stainless steel screen of the same filtration apparatus that was utilized in Example I, without any vacuum being drawn on the molten dross. The molten dross was held on the stainless steel screen for a period of about 1 minute without any partial vacuum being drawn on the dross from below the screen, whereby a seal was formed by means of forming a porous residue cake comprising small crystals of alkaline bismuthide formed on the screen. A partial vacuum of 28 inches Hg was then drawn on the porous residue cake from beneath the screen by means of the vacuum pump, whereby the molten lead on and in the porous residue cake was drawn through the pore channels of the residue cake without any major compression of the residue cake and without any significant blockage of flow due to constriction or collapse of the walls forming the pore channels of the residue cake, under the influence of the partial vacuum, and the alkaline bismuthide crystals dispersed in the molten lead were separated from the molten lead and retained by the cake.

After 1 hour, the partial vacuum was released, the heat at the funnel-shaped top of the unit was turned off, the lead seal in the kettle melted, and the filter unit was lifted from the molten lead in the kettle with the aid of a hoist and the lifting lugs. The residue cake was then removed from the screen simply by turning the filter unit upside down. The residue cake and the filtrate were separately carefully weighed, and samples obtained for analysis. The residue cake was analyzed by the same procedure as utilized in Example I. The residue cake, which had a total weight of 89 lbs., had the following analysis (percentages being by weight):

| | |
|---|---|
| Bi | 33.7 % |
| Ca | 3.4 % |
| Mg | 4.1 % |
| Pb | Substantially the balance |

DETAILED DESCRIPTION OF THE DRAWINGS

Figure 1:
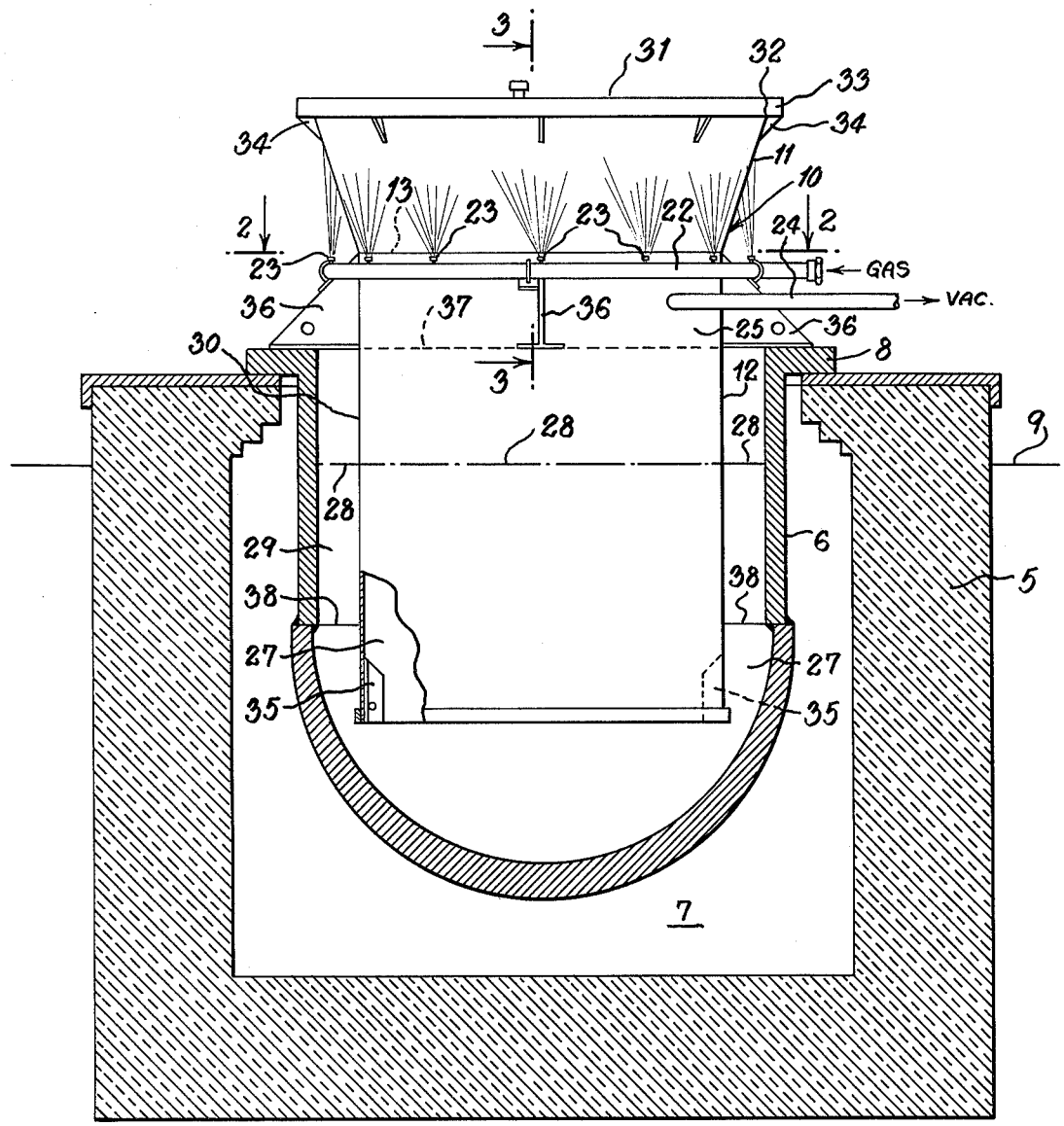
FIG. 1 is an elevational view partially in section showing apparatus for carrying out the method of the present invention.

With reference to FIG. 1 of the drawings, kettle setting 5 of refractory material receives kettle 6 for molten lead within recess or cavity 7 defined within setting 5. Kettle 6, which is fabricated of steel, is suspended within setting cavity 7 by means of lug 8 provided at the top portion of its wall, with lug 8 resting on the top edge surface of setting 5. Setting 5 and ladle 6 extend beneath the floor surface 9, as shown.

Figure 2:
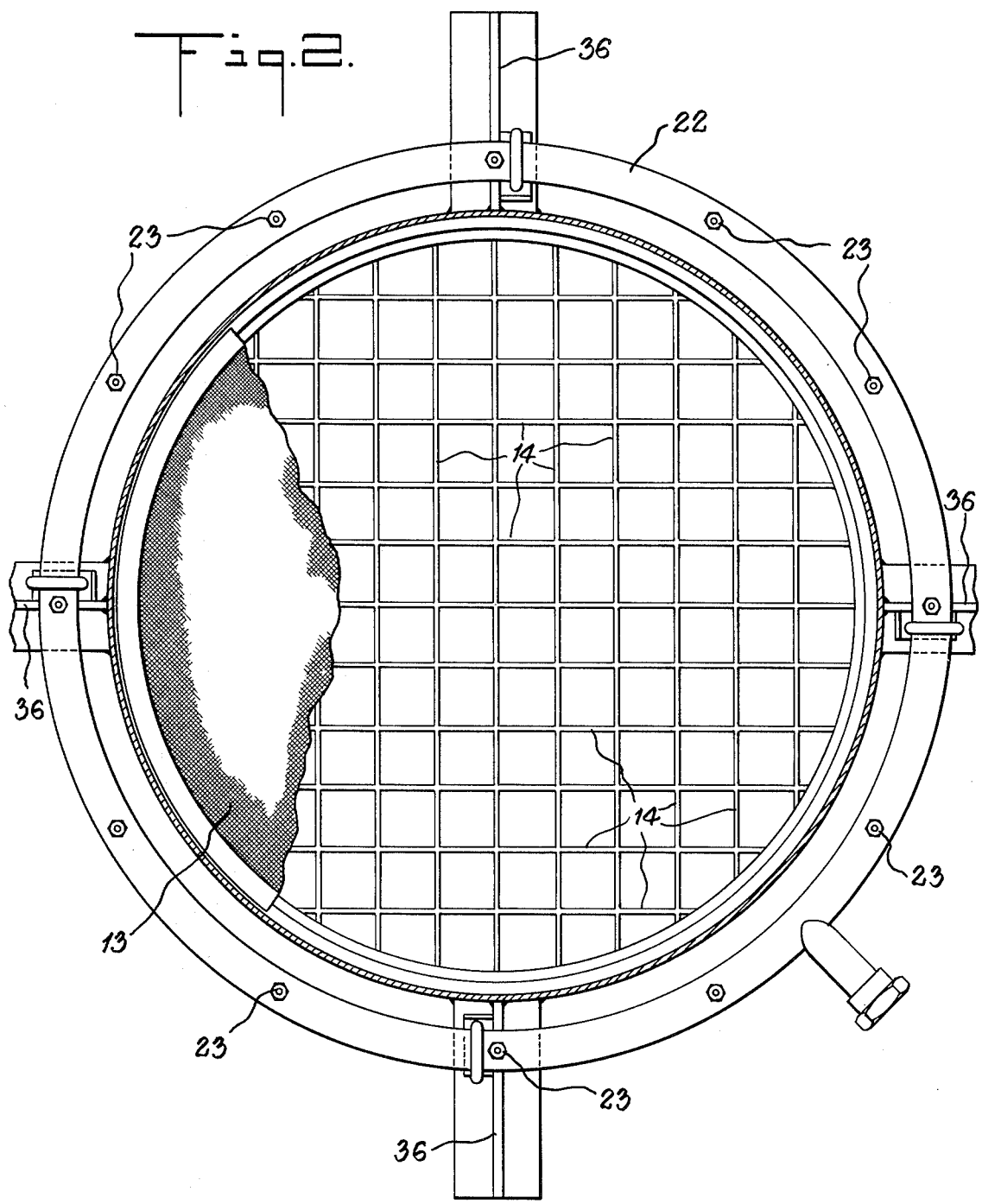
FIG. 2 is a view taken on line 2—2 of FIG. 1.
Figure 3:
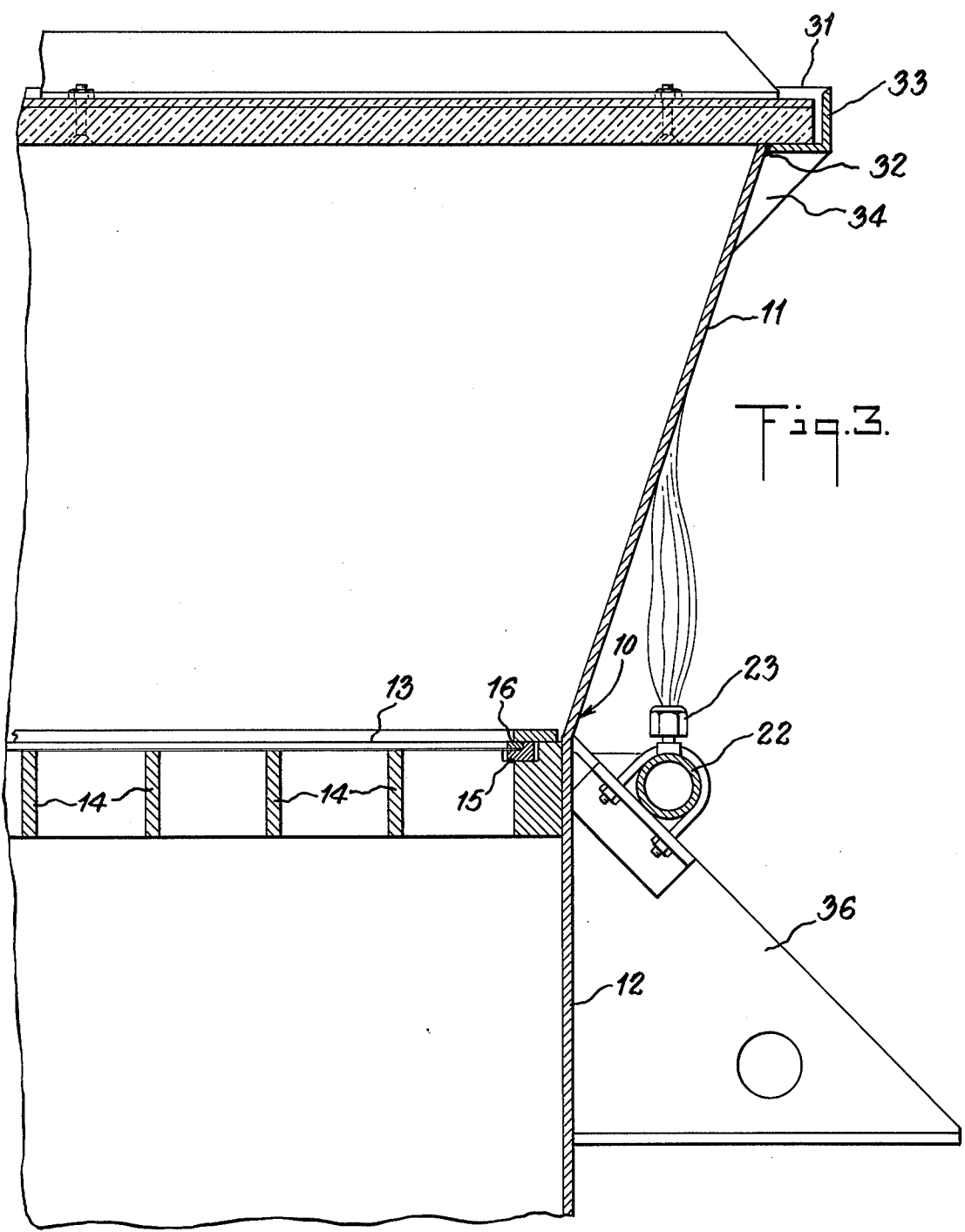
FIG. 3 is a section taken on line 3—3 of FIG. 1.
Figure 4:
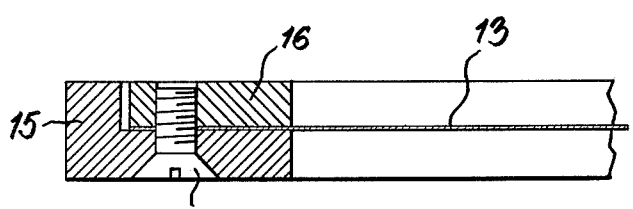
FIG. 4 is a fragmentary section through a screen assembly utilizable in apparatus for carrying out the present invention.
Figure 5:
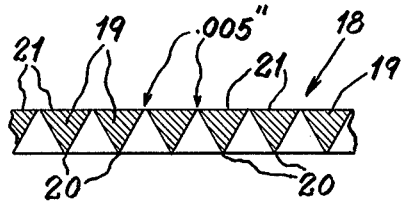
FIG. 5 is a fragmentary section through another screen utilizable in apparatus for carrying out the present invention.

Filtration unit 10, also shown in FIG. 3, includes an upper-generally funnel-shaped portion or member 11 of steel integral with cylindrical member 12 of steel. Cylindrical member 12 has open ends and extends a considerable distance within kettle 6. Filtration unit 10 is lowered into kettle 6 by means of a hoist. Screen 13, also shown in FIGS. 2, 3 and 4, rests on spaced support bars 14 of steel. Screen 13 is part of a screen assembly, shown in FIG. 4, wherein screen 13 is mounted and secured between annular angle member 15 and annular member 16 by means of flat head screws 17. Twelve such screws 17 were employed and are threadably inserted through registering drilled and tapped apertures through annular member 16 and drilled apertures with counter bore bottom sections through angle member 15. Another screen utilizable herein with good results is screen 18 shown in FIG. 5 comprising spaced apart steel bars 19 having approximately 0.005 inch openings between adjacent bars. The bars 19 are triangular in cross section with the triangular bars being so positioned in the screen of the apparatus that the apex 20 of each bar was at the lower level surface and the flat base portion 21 of each triangular bar formed the top surface of the screen, such screen being obtained from Clawson Associates of Nashville, Tenn. Pipe manifold 22 is disposed about the upper portion of cylindrical member 12 of the filter unit and adjacent the bottom portion of generally funnel shaped member 11, and is equipped with a plurality of spaced apart gas burners 23 so arranged and disposed as to heat the metal wall of funnel-shaped member 11, and hence heat the interior of the funnel-shaped member 11 and the debismuthizing dross contained therewithin. Gusset plates 36 of steel, affixed to filtration unit 10, enable the filtration unit 10 to be mounted on the upper surface of lug 8 of kettle 6. Pipe 24 communicates at one end with a sealed or substantially sealed chamber 12 (when the concentrating method herein is being practised), with the point of communication of pipe 24 with chamber 25 being on that side of screen 13 opposite the side of screen 13 on which the debismuthizing dross is supplied and herein-after disclosed in more detail, pipe 24 being connected to a suitable source of partial vacuum (not shown), such as a vacuum pump. Cylindrical member 12 of filtration unit 10 is partially immersed in a bath 27 of molten lead in kettle 6, the molten lead rising upwardly within open-ended cylindrical member 12 and, prior to and at start up of the concentrating herein, having the same or substantially the same level 28 within cylindrical member 12 as within annular space 29 defined between the wall of cylindrical member 12 and that of kettle 6. The molten lead pool 27 within the cylindrical member 12 in combination with the solid, continuous cylindrical sidewall 30 of cylindrical member 12 and the mass or layer of debismuthizing dross charged onto screen 13 form a closed or sealed chamber or compartment 25. Cover 31 is provided at the top portion of generally funnel-shaped member 11 and is received in radial enlargement cover seat 32, cover 31 being a ferrous metal and of slightly smaller diameter than cover seat 32. Seat 32 is formed at the top of funnel shaped member 11 by angle 33 of ferrous metal welded to the top portion of funnel-shaped member 11 and also supported by a plurality of spaced apart gusset plates 34. Lugs 35 at the lower portion of filtration unit 10 enable lifting and lowering of filtration unit 10 respectively out of and into kettle 12.

In operation, with cover 31 removed from filtration unit 10, debismuthizing dross containing solid particles of alkaline bismuthide, e.g. calcium magnesium bismuthide (Ca $Mg_2Bi_2$), which was skimmed from the surface of the molten lead bath in the debismuthizing kettle, is charged batchwise into funnel-shaped member 11 of filtration unit 10 and onto screen 13. Burners 23 are preferably turned on prior to charging the debismuthizing dross onto screen 13, to heat screen 13 and the funnel-shaped member 11 sufficiently to prevent cooling solidification of the molten lead in the debismuthizing dross. Cover 31 is then put in place in seat 32, and the vacuum pump started and a partial vacuum of typically 27-28 inch drawn through pipe 24 on the debismuthizing dross on screen 13. The molten lead is drawn, due to the gentle influence or "pull" of the partial vacuum, through the open and unobstructed pore channels of the filter cake or residue cake comprising the alkaline bismuthide, e.g. calcium magnesium bismuthide, solid particles, which forms on the screen 13. Such filter cake or residue cake does most, if not all or substantially all, of the filtering of the alkaline bismuthide solid particles or crystals from the molten lead, due to the fact that the diameter of the pore channels of such cake is sufficiently small to prevent at least a major portion of the alkaline bismuthide particles from passing therethrough while being sufficiently large to allow the molten lead to pass therethrough. The primary function of screen 13 is to serve as a means and support for enabling the building and the retention thereon of the filter cake or residue cake. Molten lead arises upwardly within cylindrical member 12 from molten lead pool 27 in the kettle 6 during the partial vacuum application from an original level exemplified by level 28 to a new level therewithin exemplified by level 37, and consequently the molten lead level falls in annular space from an original level exemplified by level 28 to a new level exemplified by level 38. The molten lead, after leaving the residue cake, passes through the openings of screen 13 and drops downwardly into the pool of molten lead within cylindrical member 12.

The molten lead is drawn through the pore channels of the residue cake herein without any significant physical compression of the residue cake. This is of critical importance for the reason of air-pervious cake of concentrated alkaline bismuthide is thereby produced, which enables the recovery of elemental bismuth from the cake by a process involving ignition and combustion of the cake autogenously by heating in air to liberate elemental bismuth. The pervious or permeable cake enable the atmospheric air to diffuse into the interior of the cake during the heating which is of critical importance to enable the liberation or recovery of elemental bismuth from the interior of the cake. On the contrary, in the prior art pressing of the debismuthizing dross between metal plates, there occurs significant compression of the cake with consequent collapse and/or blockage of the pore channels thereof. The result is a non-air pervious or non-air permeable cake, or such a cake of relatively low permeability to air, which is unsatisfactory for the autogenous ignition and combustion process mentioned previously herein for recovery of the elemental bismuth.

DESCRIPTION OF THE PREFERRED EMBODIMENTS

The partial vacuum that is drawn on the alkaline bismuthide-containing molten lead on and in the pervious residue due cake on the sieve or screen to draw the molten lead through the pervious residue cake is equivalent to a partial vacuum measurement value preferably in the range of about 25 to about 28 inches Hg.

The alkaline bismuthide-containing molten lead is preferably at a temperature in the range of about 750° F. to about 850° F. during the concentrating method of this invention.

The alkaline bismuthide particles, such as for example the calcium magnesium bismuthide crystals, present in the molten lead are preferably a smaller number of relatively large particles or crystals having angular, well-defined boundaries, and a largest dimension typically in the range of about 60 microns to about 200 microns, as compared with a relatively large number of relatively small particles having rounded, non-clearly defined boundaries, and a largest diameter typically in the range of about 1 micron to about 50 microns. The reason the larger particles with angular, well-defined boundaries are preferred is that the molten lead is readily separated from such larger, angular, non-rounded alkaline bismuthide particles by the method of this invention. On the contrary, in a lower grade dross having a larger number of the relatively small, rounded, bismuthide particles, which present a large surface area, the smaller, rounded or generally spherical bismuthide particles tend to attract more molten lead which is believed due to increased surface forces and to retain more molten lead when subjected to the instant concentrating method.

The higher grade dross having the smaller number of relatively large alkaline bismuthide particles having angular, well-defined boundaries as hereinbefore disclosed and which is the preferred dross for charging or supplying as feed material in the bismuthide concentrating method of this invention is obtained by carrying out the debismuthizing of the molten lead in a non-oxidizing atmosphere. Thus, for example, the alkaline material, for example calcium and magnesium is added to the molten lead in the kettle, a cover is secured on the kettle top, and an inert gas, e.g. nitrogen, is passed into the upper portion of the kettle above the upper level of the molten lead thereby creating the non-oxidizing atmosphere, which is an inert atmosphere with the supply of the inert gas, above the lead.

Preferably the pervious residue cake has an initial thickness, i.e. after being formed on the filter screen or sieve but before being subjected to the action of the partial vacuum, in the range of about 2 inches to about 14 inches.

What is claimed is:

1. A method for the concentration of alkaline bismuthide in a material comprising solid alkaline bismuthide particles and molten lead which comprises supplying the material comprising the solid alkaline bismuthide particles and molten lead onto a heat-resistant screen of substantial mechanical strength, the screen having openings of such size as to enable the retention thereon of a pervious residue cake comprising the alkaline bismuthide, subjecting the material on the screen to the influence of a partial vacuum equivalent to at least 15 inches Hg drawn from the opposite side of the screen from the material thereon comprising the alkaline bismuthide and lead, drawing the molten lead through pore channels of the residue cake comprising the alkaline bismuthide and through the screen openings under the influence of the partial vacuum without any significant physical compression of the residue cake thereby substantially minimizing blockage of the pore channels in the residue cake due to collapse and constriction of the pore channel walls, and separating the resulting air-pervious residue cake from the screen.

2. The method of claim 1 wherein a closed chamber is provided on that side of the screen opposite the side thereof having the material comprising the alkaline bismuthide and molten lead thereon, the partial vacuum being drawn on the material comprising alkaline bismuthide and molten lead on the screen through the closed chamber, the material comprising the alkaline bismuthide and molten lead on the screen forming one closure barrier of the closed chamber.

3. The method of claim 2 wherein the material comprising the alkaline bismuthide and lead is a debismuthizing dross.

4. The method of claim 2 wherein the residue cake is formed on the screen by supplying the debismuthizing dross onto the screen, and maintaining the dross on the screen without being subjected to the partial vacuum for a period sufficient to form a cake as a seal on the screen.

5. The method of claim 4 wherein the alkaline bismuthide is an alkaline earth bismuthide.

6. The method of claim 5 wherein the alkaline earth bismuthide is $CaMg_2Bi_2$.

7. The method of claim 6 wherein the calcium magnesium bismuthide particles are crystals having angular, well-defined boundaries.

8. The method of claim 6 wherein the debismuthizing dross is at a temperature in the range of about 700° F. to about 1000° F.

9. The method of claim 8 wherein the debismuthizing dross is at a temperature in the range of about 750° F. to about 850° F.

10. The method of claim 1 wherein the material comprising the alkaline bismuthide and molten lead is at a temperature in the range of about 700° F. to about 1000° F.

11. The method of claim 10 wherein the bismuthide-containing molten lead is at a temperature in the range of about 750° F. to about 850° F.

12. The method of claim 1 wherein the alkaline bismuthide particles are relatively large crystals having angular, well-defined boundaries.

13. The method of claim 12 wherein the crystals having a mean largest dimension in the range of about 60 microns to about 200 microns.

14. The method of claim 1 wherein the material comprising the alkaline bismuthide and lead is a debismuthizing dross.

15. The method of claim 1 wherein the partial vacuum is in the range of about 25 to about 28 inches Hg.

16. The method of claim 1 wherein the cake is of thickness initially in the range of about 2 inches to about 14 inches.

17. The method of claim 1 wherein the screen openings are of a size in the range of about 0.001 inch to about 0.01 inch.

* * * * *

UNITED STATES PATENT AND TRADEMARK OFFICE
CERTIFICATE OF CORRECTION

PATENT NO. : 4,039,322

DATED : August 2, 1977

INVENTOR(S) : Carl Richard Di Martini and William Lafayette Scott

It is certified that error appears in the above-identified patent and that said Letters Patent are hereby corrected as shown below:

Page 1, col. 1, in the Assignee line, "Asarco Incorporated" should read --ASARCO Incorporated--. Col. 2, line 28, "predicatable" should read --predictable--. Col. 3, line 10, "be" should read --by--. Col. 5, line 1, "as" should read --at--. Col. 6, line 19 "C." should read --F.--; line 32, "C." should read --F.--. Col. 8, line 43, "inch" should read --inches--. Col. 9, line 6, "of" should read --an--; line 30, delete "due". Col. 10, line 52, "4" should read --3--. Col. 11, lines 9 and 10, "hav-ing" should read --have--.

Signed and Sealed this

Seventeenth Day of January 1978

[SEAL]

Attest:

RUTH C. MASON
Attesting Officer

LUTRELLE F. PARKER
Acting Commissioner of Patents and Trademarks